(12) United States Patent
Du

(10) Patent No.: US 11,070,744 B2
(45) Date of Patent: Jul. 20, 2021

(54) METHOD FOR IMAGE PROCESSING BASED ON MULTIPLE CAMERA MODULES, ELECTRONIC DEVICE, AND STORAGE MEDIUM

(71) Applicant: Beijing Xiaomi Mobile Software Co., Ltd., Beijing (CN)

(72) Inventor: Hui Du, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/744,708

(22) Filed: Jan. 16, 2020

(65) Prior Publication Data

US 2021/0075975 A1    Mar. 11, 2021

(30) Foreign Application Priority Data

Sep. 10, 2019   (CN) .......................... 201910855143.3

(51) Int. Cl.
*H04N 5/247*  (2006.01)
*H04N 5/265*  (2006.01)
*H04N 5/232*  (2006.01)

(52) U.S. Cl.
CPC ......... *H04N 5/247* (2013.01); *H04N 5/23238* (2013.01); *H04N 5/23287* (2013.01); *H04N 5/23293* (2013.01); *H04N 5/265* (2013.01)

(58) Field of Classification Search
USPC .......................................................... 348/36
See application file for complete search history.

(56) References Cited

U.S. PATENT DOCUMENTS

| 8,520,081 B2 | 8/2013 | Ishii et al. |
| 8,860,849 B2 | 10/2014 | Misawa et al. |
| 10,412,298 B2 | 9/2019 | Li |
| 2002/0167593 A1* | 11/2002 | Nakayama ........... H04N 5/2254 348/207.99 |

(Continued)

FOREIGN PATENT DOCUMENTS

| CN | 102369722 A | 3/2012 |
| CN | 102821238 A | 12/2012 |

(Continued)

OTHER PUBLICATIONS

First Office Action of the Chinese Application No. 201910855143.3, dated Apr. 8, 2020.

(Continued)

*Primary Examiner* — Behrooz M Senfi
(74) *Attorney, Agent, or Firm* — Finnegan, Henderson, Farabow, Garrett & Dunner, L.L.P.

(57) ABSTRACT

A method for image processing based on multiple camera modules, includes: when a first camera module is in a dominant shooting state currently and a target shooting subject within a view-finding area of the first camera module is not contained in an initial view-finding area of a second camera module, adjusting the view-finding area of the second camera module so that the adjusted view-finding area of the second camera module covers the target shooting subject, wherein a field angle of the second camera module is smaller than that of the first camera module; and fusing an auxiliary image acquired by the second camera module with a dominant image acquired by the first camera module.

14 Claims, 6 Drawing Sheets

(56) References Cited

U.S. PATENT DOCUMENTS

| | | | |
|---|---|---|---|
| 2011/0242369 A1* | 10/2011 | Misawa | H04N 5/232 348/240.2 |
| 2012/0033094 A1 | 2/2012 | Ishii et al. | |
| 2015/0145950 A1 | 5/2015 | Murphy et al. | |
| 2016/0227100 A1* | 8/2016 | Liu | H04N 5/23216 |
| 2017/0318226 A1* | 11/2017 | Jung | H04N 5/2355 |
| 2018/0109710 A1 | 4/2018 | Lee et al. | |
| 2018/0152624 A1* | 5/2018 | Li | H04N 5/2628 |
| 2019/0147564 A1* | 5/2019 | Yuan | H04N 5/23238 382/284 |
| 2020/0128161 A1* | 4/2020 | Kroekel | H04N 5/2354 |
| 2020/0221064 A1* | 7/2020 | Yerushalmy | H04N 13/128 |

FOREIGN PATENT DOCUMENTS

| | | |
|---|---|---|
| CN | 104796615 A | 7/2015 |
| CN | 106385541 A | 2/2017 |
| CN | 106791377 A | 5/2017 |
| CN | 107770448 A | 3/2018 |
| CN | 108377342 A | 8/2018 |
| CN | 109194881 A | 1/2019 |
| CN | 109379522 A | 2/2019 |
| CN | 109923850 A | 6/2019 |
| CN | 110493526 A | 11/2019 |
| EP | 3 322 174 A2 | 5/2018 |
| EP | 3 328 055 A1 | 5/2018 |
| KR | 20160012743 A | 2/2016 |
| KR | 10-2019-00520 A | 5/2019 |
| WO | WO 2011099239 A1 | 8/2011 |
| WO | WO 2014/160819 A1 | 10/2014 |
| WO | WO 2015025878 A1 | 2/2015 |
| WO | WO 2019006762 A1 | 1/2019 |

OTHER PUBLICATIONS

Supplementary European Search Report in the European Application No. 20152830.4, dated Jul. 16, 2020.

* cited by examiner

METHOD FOR IMAGE PROCESSING BASED ON MULTIPLE CAMERA MODULES,
ELECTRONIC DEVICE, AND STORAGE
MEDIUM

CROSS-REFERENCE TO RELATED APPLICATIONS

The present application is based on and claims priority to Chinese Patent Application No. 201910855143.3 filed on Sep. 10, 2019, the entire content of which is incorporated herein by reference.

TECHNICAL FIELD

The disclosure relates to the technical field of terminals, and particularly to a method for image processing based on multiple camera modules, an electronic device, and a storage medium.

BACKGROUND

With rapid development of the terminal techniques, smart terminals, such as smart phones and tablet computers, are each configured with a camera; and a smart terminal can conduct image shooting by means of the camera configured on the smart terminal. In order to improve the quality of a shot image, some smart terminals are each configured with multiple cameras. The most common case is that a smart terminal is configured with double cameras, and the smart terminal can choose one of the double cameras to implement image shooting based on a shooting scene. For example, the double cameras configured on the smart terminal are a wide-angle camera and a telephoto camera respectively. However, different cameras are used for different shooting scenes, and an image shot by a camera having a wide coverage may have unsatisfactory image quality.

SUMMARY

According to a first aspect of the disclosure, a method for image processing based on multiple camera modules includes: when a first camera module is in a dominant shooting state currently and a target shooting subject within a view-finding area of the first camera module is not contained within an initial view-finding area of a second camera module, adjusting the view-finding area of the second camera module so that the adjusted view-finding area of the second camera module covers the target shooting subject, wherein a field angle of the second camera module is smaller than that of the first camera module; and fusing an auxiliary image with a dominant image, wherein the auxiliary image is acquired by the second camera module, and the dominant image is acquired by the first camera module.

According to a second aspect of the disclosure, an electronic device includes: first and second camera modules having different field angles; a processor; and a memory configured to store instructions executable by the processor, wherein the processor is configured to: when the first camera module is in a dominant shooting state currently and a target shooting subject within a view-finding area of the first camera module is not contained within an initial view-finding area of the second camera module, adjust the view-finding area of the second camera module so that the adjusted view-finding area of the second camera module covers the target shooting subject, wherein a field angle of the second camera module is smaller than that of the first camera module; and fuse an auxiliary image with a dominant image, wherein the auxiliary image is acquired by the second camera module, and the dominant image is acquired by the first camera module.

According to a third aspect of the disclosure, a non-transitory computer-readable storage medium has stored thereon a computer program that, when executed by a processor of a device, causes the device to perform the method according to the first aspect.

It should be understood that the general description above and detailed description below are merely exemplary and explanatory, and do not restrict the disclosure.

BRIEF DESCRIPTION OF THE DRAWINGS

The accompanying drawings herein are incorporated into the specification and constitute part of the present specification, illustrate embodiments consistent with the disclosure, and explain the principles of the disclosure together with the specification.

DETAILED DESCRIPTION

Figure 1:
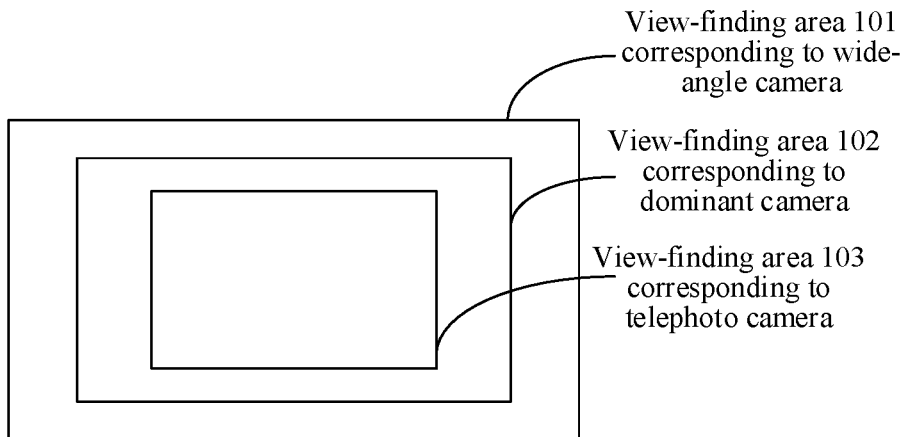
FIG. 1 illustrates a representation of view-finding areas of various cameras on a display screen according to an embodiment.

Detailed description will be made here to exemplary embodiments, examples of which are illustrated in the accompanying drawings. When drawings are involved in the following description, identical numerals in different drawings refer to identical or similar elements, unless otherwise indicated. Implementations described in the following exemplary embodiments do not represent all the implementations consistent with the disclosure. On the contrary, they are merely examples of apparatuses and methods consistent with some aspects of the disclosure recited in the appended claims.

Terms used in the disclosure are merely for describing particular embodiments, and are not intended to restrict the disclosure. Singular forms "a" or "an" used in the disclosure and the appended claims are also intended to include plural forms, unless clearly indicated otherwise in the context. It should also be understood that the term "and/or" used herein refers to and includes any or all possible combinations of one or more listed associated items.

It should be appreciated that though terms "first," "second," "third," or the like may be used to describe various pieces of information in the disclosure, and the information should not be limited by these terms. These terms are merely used for distinguishing pieces of same-type information from one another. For example, without departing from the scope of the disclosure, "first information" may also be referred to as "second information," and similarly, "second information" may also be referred to as "first information." Depending on the context, the word "if" as used herein may be interpreted as "when," "while," or "in response to determining that."

Nowadays, more and more users have got used to shooting images with terminals, such as smart phones and laptops, in daily life. At the same time, the users are having higher requirements on the quality of images shot by the terminals. With development of the camera hardware and image processing techniques, some terminals have started to be configured with multiple cameras in order to further satisfy user requirements. Each of the multiple cameras may have its own special advantage. For example, a camera is more appropriate for shooting in a certain scene, and another camera is more advantageous to shooting in another scene. In this way, when an image is shot, the terminal can select different cameras for shooting from the multiple cameras according to different shooting scenes, so that images of different scenes may be shot using the same terminal. In order to deal with different shooting scenes, the cameras often have different field angles, namely different fields of view, and correspondingly have different view-finding areas as well. The quality of images shot by the cameras with different field angles may be different. Conventionally, a view-finding range (shooting range) of a camera module is constant.

In embodiments of the present disclosure, the view-finding range of a camera module may be expanded by adjusting a view-finding area of the camera module. In the case where a first camera module is in a dominant shooting state currently and a target shooting subject within a view-finding area of the first camera module is not contained in an initial view-finding area of a second camera module, the view-finding area of the second camera module may be adjusted so that the adjusted view-finding area of the second camera module covers the target shooting subject; and an auxiliary image acquired by the second camera module is fused with a dominant image acquired by the first camera module, so as to achieve the effect of enhancing image quality. Further, since the second camera module is adjusted, the coverage of the second camera module is expanded, so that the adjusted view-finding area can cover an area not contained within the initial view-finding area. As such, image quality of at least part of the image area can be enhanced.

Methods for image processing based on multiple camera modules provided in the embodiments may be performed through software, or hardware, or a combination of software and hardware. The hardware involved may be composed by one or more physical entities. In some embodiments, the methods may be performed by shooting software in an electronic device. The electronic device may be a smart phone, a tablet, a laptop, a desktop, a personal digital assistant (PDA), a wearable device, etc.

The camera module may be configured on the electronic device and constitute an all-in-one machine together with the electronic device. The camera module may also be an independent device which can be carried on the electronic device. The multiple camera modules may be at least two camera modules. The camera modules are used for acquiring images, and each camera module may include one or more cameras. By way of example, the multiple camera modules include one or more of the following: a wide-angle camera module, a telephoto camera module, a universal camera module, a color camera, a black-white camera and so on. The universal camera module may also be referred to as a dominant camera module, and serves as a dominant shooting camera module in the electronic device, and the universal camera module includes a dominant camera. In embodiments of the disclosure, the multiple camera modules may be camera modules having different field angles so as to utilize an image acquired by a camera module having a smaller field angle to enhance an image acquired by a camera module having a larger field angle, achieving the effect of enhancing image quality. In one embodiment, the multiple camera modules may be three camera modules, including a wide-angle camera (DW) module, a universal camera (W) module and a telephoto camera (Tele) module, the field angles of which decrease successively. For example, a wide-angle camera in the wide-angle camera module may have a field angle of 120°, 13 M (million) to 48 M pixels. A universal camera in the universal camera module may have a field angle of 80° and 48 M to 64 M pixels. A telephoto camera in the telephoto camera module may have a field angle of 30° to 20°, and 13 M to 8 M pixels.

FIG. 1 illustrates a representation of view-finding areas of various cameras on a display screen according to an embodiment. The wide-angle camera has a maximum field angle, the field angle of the universal camera (dominant camera) is the secondary, and the field angle of the telephoto camera is the minimum. Correspondingly, sizes of respective view-finding areas 101, 102, and 103 also decrease successively. It is appreciated that FIG. 1 is merely to illustrate that cameras with different field angles have different view-finding areas, and the proportional relation among different view-finding areas may be determined according to actual situations.

In some application scenarios, when different camera modules are used in shooting, a subject concerned by one of the camera modules when shooting may, or may not, be within the field of view of another one of the camera modules. To this end, in the embodiments of the disclosure, in order to avoid an unsatisfactory fusion effect caused by a concerned shooting subject of one camera module not being within the field of view of another camera module, a view-finding area of the another camera module is adjusted so that the view-finding area of the another camera module covers a target shooting subject that would not have been covered.

Figure 2:
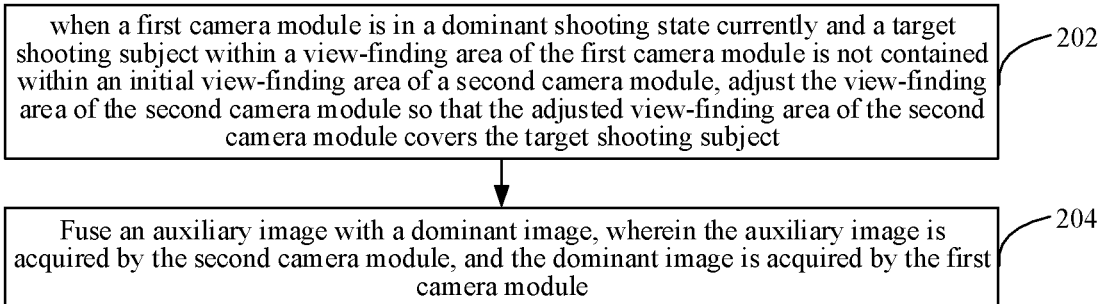
FIG. 2 illustrates a flowchart of a method for image processing based on multiple camera modules according to some embodiments of the disclosure.

FIG. 2 illustrates a flowchart of a method for image processing based on multiple camera modules according to some embodiments of the disclosure. The method includes the following steps:

In step 202, when a first camera module is in a dominant shooting state currently and a target shooting subject within a view-finding area of the first camera module is not contained within an initial view-finding area of a second camera module, the view-finding area of the second camera module is adjusted so that the adjusted view-finding area of the second camera module covers the target shooting subject. A field angle of the second camera module is smaller than that of the first camera module.

In step 204, an auxiliary image is fused with a dominant image. The auxiliary image is acquired by the second camera module, and the dominant image is acquired by the first camera module.

In this embodiment, when one of the camera modules is selected for shooting, another one of the camera modules having a smaller field angle may be used as an auxiliary camera module to enhance the imaging effect. For illustration purposes, the camera module selected for shooting is referred to as the first camera module, and the other camera module having the smaller field angle is referred to as the second camera module. The first camera module is selected for shooting, and the first camera module may be considered to be in a dominant shooting state at this time. The second camera module serves as an auxiliary camera module, and the second camera module may be considered to be in an auxiliary shooting state at this time. Correspondingly, an image acquired by the first camera module may be referred to as a dominant image, and an image acquired by the second camera module may be referred to as an auxiliary image.

With a wide-angle camera module, a universal camera module, and a telephoto camera module as examples, they are generally ranked to be: the wide-angle camera module, the universal camera module, and the telephoto camera module according to the field angles thereof from large to small. Accordingly, when the wide-angle camera module serves as the first camera module, the second camera module may be the universal camera module, or even may be the telephoto camera module. When the universal camera module serves as the first camera module, the second camera module may be the telephoto camera module.

When the first camera module is in a dominant shooting state currently, a target shooting subject in the view-finding area of the first camera module may be determined. The target shooting subject may be a shooting point, or may be a shooting area, etc. In the embodiment, the target shooting subject is a subject concerned within the view-finding area of the first camera module. There may be one or more target shooting subjects in the view-finding area of the first camera module.

With respect to the adjustment of the view-finding area of the second camera module, the adjustment can be made such that the adjusted view-finding area of the second camera module covers the target shooting subject.

In some embodiments, an optical anti-shaking apparatus is provided in an image acquisition apparatus of a mobile device, to avoid a blurred shot image caused by shaking during handheld shooting. The optical anti-shaking apparatus may be an anti-shaking controller in the mobile device, which may also be referred to as an optical image stabilization (OIS) controller, and correct an optical axis offset by controlling the floating of an optical lens. The principle may be that a sensor in a camera detects minor movement and then transports a signal to a micro-processor, the micro-processor calculates a displacement to be compensated, and makes compensation according to the shaking direction and displacement of the camera by means of a compensation camera group. Image blurring caused by shaking of the mobile device is overcome effectively. To this end, as an example, the view-finding area of the second camera module may be adjusted through OIS.

By way of example, the OIS of the camera may be designed with a large angle so as to expand the view-finding range realizable by the camera. In an example, the OIS of the camera in the second camera module may be designed with a large angle, so that the view-finding range (the range corresponding to a set of multiple view-finding areas) realizable by the second camera module can cover the view-finding range of the first camera module. With the telephoto camera module as an example, the view-finding range realizable by the telephoto camera (Tele) module may be compensated through OIS so that the view-finding range realizable by the telephoto camera module may be expanded for example by 3% to 5% on the original basis.

In this embodiment, the view-finding area of the second camera module is adjusted through OIS. Costs may be reduced while expanding the view-finding range realizable by the second camera module, without the need of adding other hardware.

It should be understood that the view-finding area of the second camera module may also be adjusted by other means. For example, the camera of the second camera module in some terminals may be turnable, and then the view-finding area of the second camera module may be adjusted by turning the camera with the terminal kept still. For the other means of adjustment, the only requirement is that the target shooting subject can be shot by the second camera module. Further, during the adjustment of the view-finding area of the second camera module, the view-finding area of the first camera module may be kept unchanged.

In an embodiment, the operation of adjusting the view-finding area of the second camera module includes: determining a current view-finding area of the second camera module; and adjusting, through OIS, the current view-finding area of the second camera module to a maximum range, to obtain a maximum view-finding area of the second camera module. The target shooting subject is a shooting point in a part of the maximum view-finding area of the second camera module that does not overlap with the initial view-finding area.

The maximum range is a maximum range that can be reached by OIS adjustment. By way of example, the OIS of the camera may be designed with a large angle so as to cover the view-finding area of the other camera having a larger field angle as far as possible.

Figure 3:
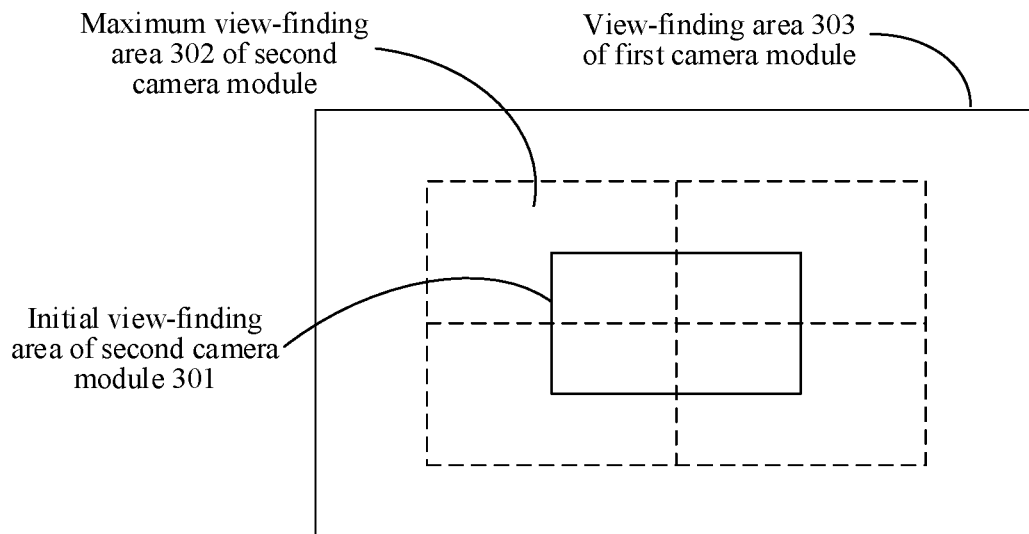
FIG. 3 illustrates a schematic diagram of a maximum view-finding area according to some embodiments of the disclosure.

The maximum view-finding area is a set of the view-finding areas of the second camera module after all adjustments through OIS. The maximum view-finding area may be determined by the adjustment extent of OIS and the view-finding range of the second camera module, for example, constituted by a set of the adjusted view-finding areas of the second camera module after M adjustments. FIG. 3 illustrates a schematic diagram of a maximum view-finding area according to some embodiments of the disclosure. In the schematic diagram, with M=4 as an example, the solid box denotes an initial view-finding area 301. Four adjustments have been made, and an adjusted view-finding area is obtained through each adjustment and is denoted with a dotted box. The four adjusted view-finding areas constitute the maximum view-finding area 302, as illustrated by the four dotted boxes in FIG. 3. It should be understood that M is not limited to 4, and may also be other numeric values. Additionally, the adjusted view-finding areas in the set may or may not overlap with one another, which may be decided by the adjustment extent. The maximum view-finding area 302 being smaller than the view-finding area of the first camera module 303 is taken as an example in FIG. 3. In some embodiments, the maximum view-finding area 302 may also be greater than or equal to the view-finding area 303 of the first camera module.

Correspondingly, the auxiliary images mentioned in the fusing process include the auxiliary images acquired by the second camera module after each adjustment, so as to enhance the quality of the dominant image by utilizing one or more images.

In this embodiment, a maximum view-finding area may be obtained by adjusting, through OIS, the current view-finding area of the second camera module to a maximum range, so as to enhance image quality to the greatest extent.

In another embodiment, the view-finding area of the second camera module may be adjusted, through OIS, to move towards the target shooting subject, so that the adjusted view-finding area of the second camera module covers the target shooting subject.

In an embodiment, the target shooting subject may be a subject concerned within the view-finding area of the first camera module. The operation of adjusting the view-finding area of the second camera module may include: determining a target direction according to a position relation between the target shooting subject and the initial view-finding area; and adjusting, through OIS, the second camera module to operate in the target direction.

In this embodiment, the second camera module is controlled to operate in the target direction so that the target shooting subject can be shot by the second camera module; in this way, the image quality of the target shooting subject can be enhanced.

As an example, the target shooting subject includes: a focus point in the view-finding area of the first camera module, or a focus area determined by the focus point. The focus point may be determined by shooting software automatically focusing according to the view-finding area, or may be determined by a detected focus point control signal. It is appreciated that the focus point may also be determined by other means.

Figure 4:
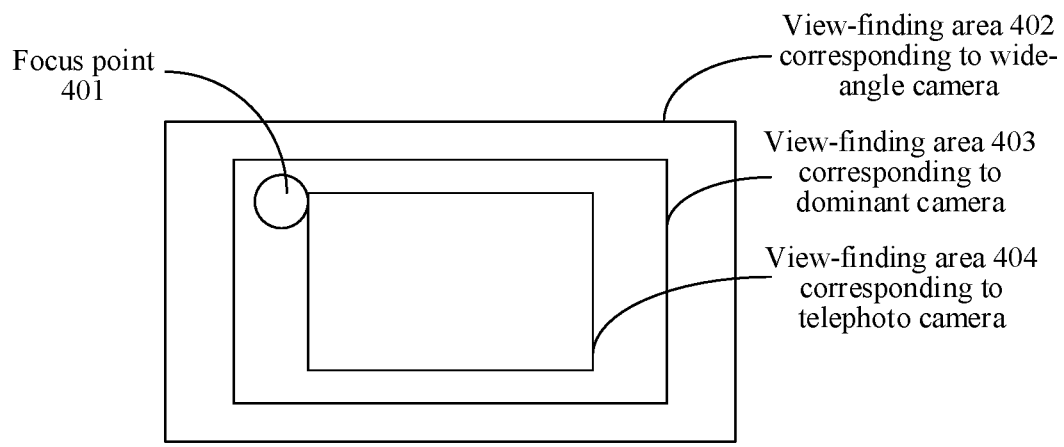
FIG. 4 illustrates a schematic diagram of a focus point according to some embodiments of the disclosure.

FIG. 4 illustrates a schematic diagram of a focus point 401 according to some embodiments of the disclosure. In the schematic diagram, the multiple camera modules may be a wide-angle camera module containing a wide-angle camera corresponding to a view-finding area 402, a universal camera module containing a dominant camera corresponding to a view-finding area 403, and a telephoto camera module containing a telephoto camera corresponding to a view-finding area 404. With the first camera module being the universal camera module and the second camera module being the telephoto camera module as examples, when a focus area in the view-finding area of the first camera module is not contained within the view-finding area of the second camera module, then the view-finding area of the second camera module may be adjusted so that the focus area in the view-finding area of the first camera module is contained within the view-finding area of the second camera module.

In this embodiment, since the target shooting subject includes the focus point in the view-finding area of the first camera module or the focus area determined by the focus point, the resolution and image quality at the focus point or the focus area may be improved by utilizing the image acquired by the second camera module. The resolution may be referred to as image resolution as well, and is the capability of distinguishing details of a shot object. The resolution is a physical quantity for describing the capability of a micro-camera system to reproduce small parts of a shot element, and is an important index for evaluating image resolution power. An image of higher resolution has more details. The resolution may be used to reflect the definition of a shot image.

As an example, the target shooting subject may include a specified area in the view-finding area of the first camera module. The specified area may be specified by a software developer in advance, or may be specified by a user through a setting page, etc. For example, users often concern a middle area of a picture; therefore, the specified area may be the middle area so as to improve the resolution and image quality at the middle area using the image acquired by the second camera module. For another example, the specified area may be an upper part, a lower part, a left part, a right part, an edge part, etc. in the picture.

In this embodiment, since the target shooting subject includes the specified area in the view-finding area of the first camera module, the resolution and image quality of the specified area may be improved by utilizing the image acquired by the second camera module.

As an example, the target shooting subject may include the view-finding area of the first camera module. For example, the first camera module is a universal camera module, and the second camera module is a telephoto camera module. The target shooting subject may be the entire view-finding area of the first camera module, so as to improve the quality of the entire image acquired by the first camera module, by utilizing the image acquired by the second camera module.

It should be understood that the target shooting subject includes but is not limited to the above subjects, and may also be other subjects.

The operation of adjusting the view-finding area of the second camera module is to enable the target shooting subject to be shot by the second camera module. In the case where the second camera module contains only one camera, the size of the target shooting subject may be smaller than or equal to that of the view-finding area of the second camera module. For example, the target shooting subject includes a focus point in the view-finding area of the first camera module, a focus area determined by the focus point, or a specified area in the view-finding area of the first camera module, and the size of the target shooting subject may be smaller than or equal to that of the view-finding area of the second camera module. In other words, the target shooting subject can appear in a same view-finding area of the second camera module in its entirety.

In an embodiment, the second camera module includes a camera. The operation of enabling the view-finding area of the second camera module to cover the target shooting subject includes: causing the target shooting subject to be within a same view-finding area of the second camera module or at a specific position in the same view-finding area of the second camera module. The specific position is a preset position or a position determined by a detected operation signal.

Figure 5:
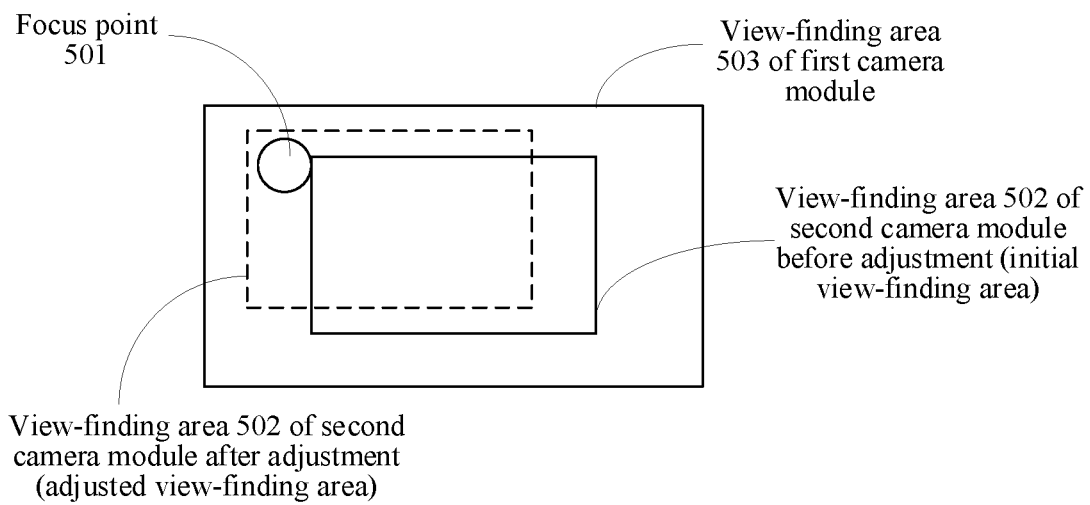
FIG. 5 illustrates a schematic diagram of comparison of a view-finding area before and after an adjustment according to some embodiments of the disclosure.

For example, the view-finding area of the second camera module is adjusted so that the target shooting subject can appear in the view-finding area of the second camera module or appears at a preset position (such as a middle position) in the view-finding area of the second camera module as far as possible. FIG. 5 illustrates a schematic diagram of comparison of a view-finding area 502 before and after an adjustment according to some embodiments of the disclosure. In the schematic diagram, the circle denotes a target shooting subject determined by a focus point 501, the smaller solid box denotes a view-finding area 502 (referred to as an initial view-finding area) of the second camera module before the adjustment, and the larger solid box denotes a view-finding area 503 of the first camera module. The target shooting subject is not within the smaller solid box, and therefore, the view-finding area 502 of the second camera module is adjusted. The smaller dotted box denotes the adjusted view-finding area 502 of the second camera module. The target shooting subject is within the smaller dotted box, that is to say, the target shooting subject is within the same view-finding area of the second camera module.

When the adjustment of the second camera module is great enough, it can also be specified that the target shooting subject falls at a specific position in the view-finding area of the second camera module. The specific position may be a preset position, such as a position preset by a developer, or a position preset by a user, for example, a middle position, a position offset to the upper part from the middle, etc. The specific position may also be determined by a detected operation signal. For example, setting prompt information is popped up during view finding, to prompt the user to set the position where the target shooting subject will appear in the view-finding area of the second camera module.

In this embodiment, since a same view-finding area of the second camera module can cover the target shooting subject, the view-finding area of the second camera module can be adjusted such that the target shooting subject falls in the same shooting area of the second camera module or at the specific position in the same shooting area of the second camera module. Images acquired by the first camera module and the adjusted second camera module simultaneously can be fused subsequently, so as to enhance the dominant image acquired by the first camera module.

In some embodiments, the second camera module contains only one camera, and a size of the target shooting subject is greater than that of the view-finding area of the second camera module. For example, when the target shooting subject is a specified area in the view-finding area of the first camera module or the view-finding area of the first camera module, the range of the target shooting subject may be greater than that of the view-finding area of the second camera module. Accordingly, the view-finding area of the second camera module may merely cover part of the target shooting subject.

In an embodiment, the second camera module includes a camera, and a size of the target shooting subject is greater than a size of the view-finding area of the target shooting subject. The target direction at least includes two target sub-directions.

The operation of adjusting, through OIS, the second camera module to operate in the target direction includes: for each target sub-direction, adjusting, through OIS, the second camera module to operate in the target sub-direction.

The target shooting subject is within a first spliced view-finding area, and the first spliced view-finding area is obtained by splicing adjusted view-finding areas obtained through all adjustments. Correspondingly, the operation of enabling the adjusted view-finding area of the second camera module to cover the target shooting subject may be that the first spliced view-finding area obtained through all adjustments is enabled to cover the target shooting subject.

If the target shooting subject cannot be displayed in the same view-finding area of the second camera module, multiple adjustments may be made to the second camera module so that the target shooting subject is shot. For example, adjustments may be made with the purpose that each adjusted second camera module can cover part of the target shooting subject, so that all parts of the target shooting subject can be spliced to obtain the complete target shooting subject. Assuming that at least N view-finding areas of the second camera module are needed to cover the entire target shooting subject, then N adjustments are made such that the target shooting subject is contained within a first spliced view-finding area of the second camera module. The first spliced view-finding area is obtained by splicing adjusted view-finding areas obtained through all adjustments. The view-finding areas obtained through different adjustments may or may not overlap, which can be particularly configured as required.

In a subsequent fusing process, the auxiliary images acquired by the second camera module may include auxiliary images, each acquired by an adjustment of the second camera module in the target sub-direction. For example, the auxiliary images acquired by the second camera module after adjustments of the view-finding area can be fused with the dominant image respectively. The auxiliary images acquired by the second camera module after all adjustments can also be spliced first to obtain a spliced auxiliary image, and then the spliced auxiliary image is fused with the dominant image to enhance the quality of the dominant image.

The multiple adjustments of the view-finding area of the second camera module may be performed according to an adjustment strategy. The adjustment strategy includes an adjustment instruction for each adjustment, so as to adjust the second camera module to operate in the target sub-direction. The adjustment strategy may be specified in advance, or may be generated according to a position relation between the target shooting subject and the initial view-finding area.

In an embodiment, the target shooting subject may be the view-finding area of the first camera module. In this embodiment, even though the view-finding range of the second camera module is smaller than that of the first camera module, a set of the view-finding areas obtained through multiple adjustments can be enabled to cover the view-finding area of the first camera module, by adjusting the view-finding area of the second camera module, thus achieving the effect of expanding the view-finding range realizable by the second camera module. Further, the number of adjustments of the view-finding area of the second camera module may be determined by the ratio of the view-finding range of the first camera module to the view-finding range of the second camera module.

Figure 6A:
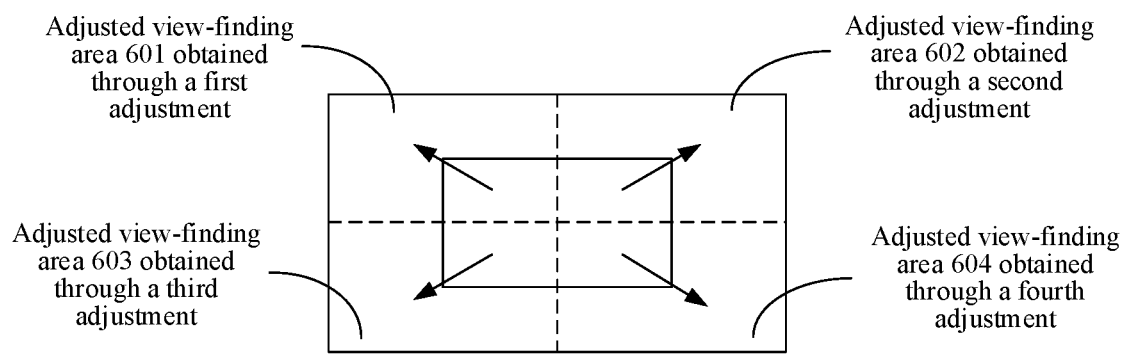
FIG. 6A illustrates a schematic diagram of a first spliced view-finding area according to some embodiments of the disclosure.

FIG. 6A illustrates a schematic diagram of a first spliced view-finding area according to some embodiments of the disclosure. It is assumed that the view-finding area of the first camera module needs to be constituted by splicing at least N view-finding areas of the second camera module. In the schematic diagram, exemplary illustration is made with N=4 as an example. In FIG. 6A, the dotted box at the upper left corner illustrates an adjusted view-finding area 601 obtained through a first adjustment, the dotted box at the upper right corner illustrates an adjusted view-finding area 602 obtained through a second adjustment, the dotted box at the lower left corner illustrates an adjusted view-finding area 603 obtained through a third adjustment, and the dotted box at the lower right corner illustrates an adjusted view-finding area 604 obtained through a fourth adjustment. The solid box is the view-finding area of the first camera module. The adjusted view-finding areas 601, 602, 603, and 604 obtained after the first, second, third and fourth adjustments, respectively, are spliced to obtain a first spliced view-finding area. It can be seen that the first spliced view-finding area covers the view-finding area of the first camera module. It is appreciated that the size of the first spliced view-finding area may be greater than or equal to that of the view-finding area of the first camera module, and an example of the sizes being same is illustrated in the drawing. Since the view-finding ranges of the first camera module and the second camera module are fixed, the adjustment strategy, including an adjustment instruction for each adjustment, may be preset. For example, an adjustment instruction for the first adjustment, an adjustment instruction for the second adjustment, an adjustment instruction for the third adjustment and an adjustment instruction for the fourth adjustment can be preset so as to adjust the view-finding area of the second camera module to a corresponding position through the different adjustment instructions. In this embodiment, there is no need of determining an adjustment strategy temporarily, and the processing speed can be improved.

In some application scenarios, it may be unable to allow the target shooting subject to fall in the same view-finding area of the second camera module due to that the size of the target shooting subject is greater than that of the view-finding area of a camera in the second camera module, or it may be unable to allow the target shooting subject to fall in the same view-finding area of the second camera module due to the restriction of an adjustment extent, even though the range of the target shooting subject is smaller than or equal to the view-finding range of the camera in the second camera module. In view of this, in another embodiment, the second camera module includes at least two cameras. The size of a view-finding sub-area of a single camera may be smaller than or greater than that of the view-finding area of the target shooting subject, and a set of view-finding areas constituted by the view-finding sub-areas of the at least two cameras may be greater than or equal to the desired view-finding area of the target shooting subject in the camera module. Cameras in the same camera module may be of the same type. With a telephoto camera module as an example, multiple cameras in the telephoto camera module may be telephoto cameras.

Correspondingly, the target direction at least includes two target sub-directions. The operation of adjusting, through OIS, the second camera module to operate in the target direction includes: adjusting, through OIS, a camera of the second camera module to operate in the corresponding target sub-directions respectively.

The target shooting subject is within a second spliced view-finding area, and the second spliced view-finding area is obtained by splicing adjusted view-finding areas of all the cameras in the second camera module.

The auxiliary image acquired by the second camera module includes: all images acquired by the adjusted camera.

In this embodiment, multiple cameras are adjusted such that the view-finding area of the second camera module covers the target shooting subject. The problem caused due to that the size of a target shooting subject is too large or the adjustment range of a single camera is limited can be avoided.

Figure 6B:
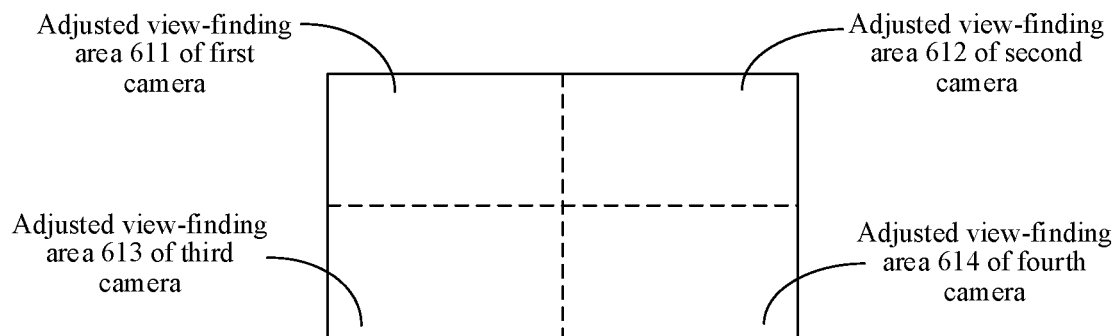
FIG. 6B illustrates a schematic diagram of a second spliced view-finding area according to some embodiments of the disclosure.

FIG. 6B illustrates a schematic diagram of a second spliced view-finding area according to some embodiments of the disclosure. It is assumed that the view-finding area of the first camera module is constituted by splicing view-finding areas of at least N cameras in the second camera module. In the schematic diagram, exemplary illustration is made with N=4 as an example. In the diagram, the dotted box at the upper left corner illustrates an adjusted view-finding area 611 obtained by adjusting a first camera, the dotted box at the upper right corner illustrates an adjusted view-finding area 612 obtained by adjusting a second camera, the dotted box at the lower left corner illustrates an adjusted view-finding area 613 obtained by adjusting a third camera, and the dotted box at the lower right corner illustrates an adjusted view-finding area 614 obtained by adjusting a fourth camera. The solid box is the view-finding area of the first camera module, or is the target shooting subject. The adjusted view-finding areas 611, 612, 613, and 614 of the first, second, third and fourth cameras, respectively, are spliced to obtain a second spliced view-finding area. It can be seen that the target shooting subject can appear in the second spliced view-finding area.

It should be understood that the adjustment approaches above are merely exemplary, and other existing or future adjustment approaches of enabling the second camera module to shoot the target shooting subject may be adapted to the disclosure, and should all fall within the scope of protection of the disclosure.

With regard to the time of acquiring the dominant image and the auxiliary images, in the case where the second camera module includes one camera and the size of the target shooting subject is smaller than or equal to that of the view-finding area of the second camera module, or in the case where the second camera module includes multiple cameras, the auxiliary images may be acquired at the same time with the dominant image. In the embodiment where multiple adjustments are made to the view-finding area of the second camera module, the auxiliary images may be acquired by the second camera module after respective adjustments of the view-finding area. The dominant image may be acquired at the same time as any of multiple auxiliary images, or may be acquired at any time point during the acquisition of the multiple auxiliary images. Since images are acquired at a high frequency, and there is little difference between images continuously acquired within a short period of time, multiple auxiliary images may be used to enhance the image quality of a single dominant image.

In embodiments of the disclosure, an image acquired by a camera module having a smaller field angle is used to enhance an image acquired by a camera module having a larger field angle; therefore, the auxiliary images acquired by the adjusted second camera module may be fused with the dominant image acquired by the first camera module, to obtain a fused image. In some scenarios, the auxiliary images involved in a fusing process may also include the auxiliary image acquired by the second camera module before adjustment, which can be particularly configured as required. In the fusing process, all the overlapped parts may be fused, or some of the fused part may be fused. Since the field angle of the second camera module is smaller than that of the first camera module, an image of higher quality may be obtained by fusing the auxiliary images with the dominant image. For example, a preset image fusion algorithm may be used to fuse all or some of the overlapped parts with the dominant image, to obtain a fused image. Reference can be made to fusion algorithms in the related art for a particular image fusion algorithm, which will not be specified here.

In an embodiment, the fusion is executed in a process of view finding; or the fusion is executed after receiving a shooting operation instruction. In this embodiment, the fused image can be displayed no matter in in the process of view finding or after a shooting operation.

In some embodiments, during shooting with different camera modules, a subject concerned when shooting with one of the camera modules may be within the field of view of another camera module. Accordingly, the method further includes: when the first camera module is in the dominant shooting state currently and the target shooting subject within the view-finding area of the first camera module is contained within the initial view-finding area of the second camera module, fusing the auxiliary image acquired by the second camera module with the dominant image acquired by the first camera module.

In this embodiment, if the target shooting subject is within the view-finding area of the second camera module, there is no need of adjusting the second camera module; instead, the image acquired by the second camera module may be directly utilized to enhance the quality of the image acquired by the first camera module.

Various technical features in the embodiments above can be arbitrarily combined as long as the combination among the features do not lead to conflicts or contradictions. Therefore, any combination of the various technical features in the embodiments above falls within the scope of the disclosure as well.

Explanation is made with two of the combinations as examples.

In an example, in a process of shooting, a user usually concerns the middle position or focus position of a picture. The universal camera (W) module has advantages in image quality and resolution with respect to the wide-angle camera (DW) module. Therefore, at the same time of shooting with the wide-angle camera (DW) module, a picture is also taken with the universal camera (W) module, then the picture taken by the universal camera (W) module is used to perform fusion enhancement on the middle part of the picture of the wide-angle camera (DW) module, so as to improve the image quality of the middle area. An image is acquired using the telephoto camera (Tele) module while shooting with the universal camera (W) module, and the image quality of the focus area of the universal camera (W) module can be enhanced by the image acquired by the telephoto camera (Tele) module when the focus point of the picture taken by the universal camera (W) module is within the range of the image acquired by the telephoto camera (Tele) module. If the focus point of the picture taken by the universal camera (W) module is not within the range of the image acquired by the telephoto camera (Tele) module, the range of the image acquired by the telephoto camera (Tele) module can be adjusted so that the focus point of the picture taken by the universal camera (W) module is within the range of the image acquired by the telephoto camera (Tele) module.

The OIS of the telephoto camera (Tele) module may be designed with a large angle so that the telephoto camera (Tele) module can cover the entire field of view (FOV) of the universal camera module. The view-finding area of the telephoto camera (Tele) module is adjusted to a corresponding position according to the focus position for shooting of the universal camera module; then the universal camera module and the telephoto camera module perform shooting together, and then images acquired thereby are fused to improve the resolution and enhance the image quality at the focusing position.

Figure 7:
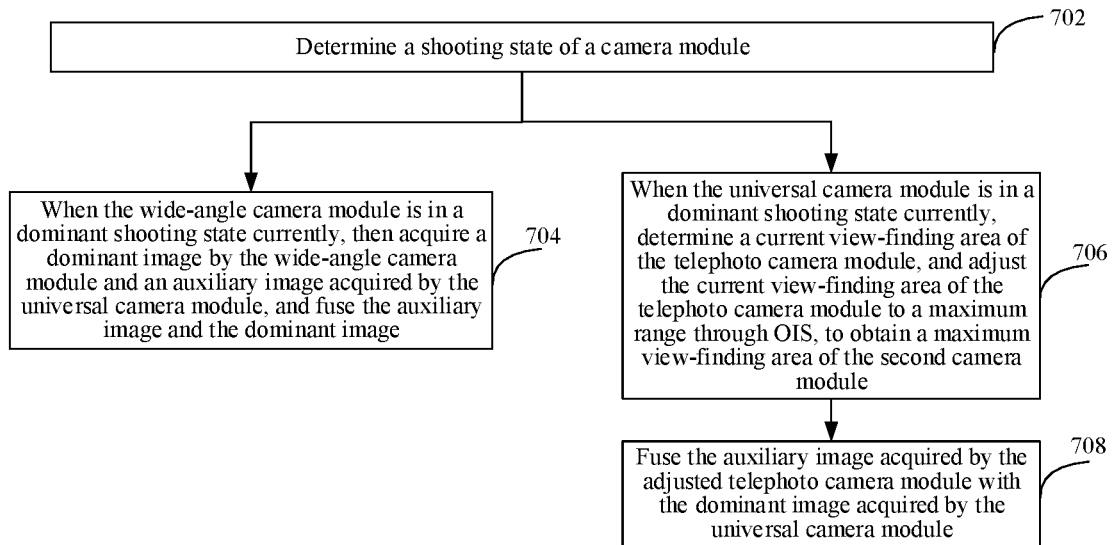
FIG. 7 illustrates a flowchart of a method for image processing based on multiple camera modules according to some embodiments of the disclosure.

In another example, FIG. 7 illustrates a flowchart of a method for image processing based on multiple camera modules according to some embodiments of the disclosure. The multiple camera modules include: a wide-angle camera (DW) module, a universal camera (W) module, and a telephoto camera (Tele) module, the field angles of which decrease successively. The method includes the following steps.

In step 702, a shooting state of a camera module is determined.

In step 704, when the wide-angle camera module is in a dominant shooting state currently, then a dominant image acquired by the wide-angle camera module and an auxiliary image acquired by the universal camera module are obtained and are fused.

In step 706, when the universal camera module is in a dominant shooting state currently, a current view-finding area of the telephoto camera module is determined; and the current view-finding area of the telephoto camera module is adjusted to a maximum range through OIS, to obtain a maximum view-finding area of the second camera module.

In step 708, the auxiliary image acquired by the adjusted telephoto camera module is fused with the dominant image acquired by the universal camera module.

In this embodiment, through a combination of different cameras, the resolution and image quality of a picture of a current scene are improved when shooting different scenes. For example, the view-finding range realizable by the telephoto camera (Tele) module is expanded through OIS, thus improving the image quality when the universal camera module is in a dominant shooting state (referred to as a dominant shooting mode).

In the various preceding method embodiments, methods are all described as a combination of a series of actions for simplified description; however, those skilled in the art should be aware that the disclosure is not limited by the described sequence of actions, because some steps may be carried out in other sequences or simultaneously according to the disclosure.

Corresponding to the preceding embodiments of the methods for image processing based on multiple camera modules, embodiments of an apparatus for image processing based on multiple camera modules, a device to which the apparatus is applied, and a storage medium are also provided.

Figure 8:
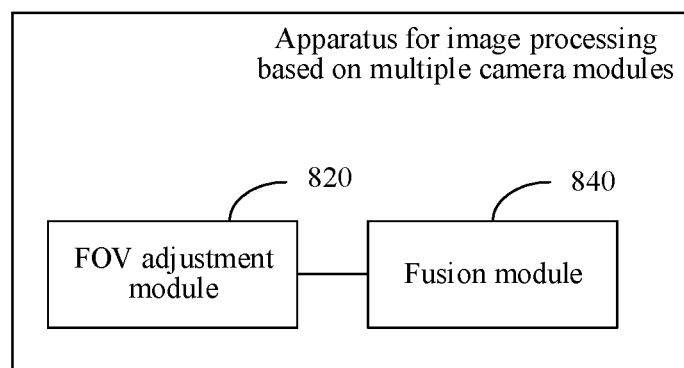
FIG. 8 illustrates a block diagram of an apparatus for image processing based on multiple camera modules according to some embodiments of the disclosure.

FIG. 8 illustrates a block diagram of an apparatus for image processing based on multiple camera modules according to some embodiments of the disclosure. The apparatus includes a field adjustment module 820 and a fusion module 840.

The field adjustment module 820 is configured to: when a first camera module is in a dominant shooting state currently and a target shooting subject within a view-finding area of the first camera module is not contained within an initial view-finding area of a second camera module, adjust the view-finding area of the second camera module so that the adjusted view-finding area of the second camera module covers the target shooting subject. A field angle of the second camera module is smaller than that of the first camera module.

The fusion module 840 is configured to fuse an auxiliary image with a dominant image. The auxiliary image is acquired by the second camera module, and the dominant image is acquired by the first camera module.

In an embodiment, the operation that the field adjustment module 820 adjusts the view-finding area of the second camera module includes: determining a current view-finding area of the second camera module; and adjusting, through optical image stabilization (OIS), the current view-finding area of the second camera module to a maximum range, to obtain a maximum view-finding area of the second camera module.

The target shooting subject is any shooting point in a part of the maximum view-finding area of the second camera module that does not overlap with the initial view-finding area.

In an embodiment, the target shooting subject is a subject concerned within the view-finding area of the first camera module, and the operation that the field adjustment module 820 adjusts the view-finding area of the second camera module includes: determining a target direction according to a position relation between the target shooting subject and the initial view-finding area; and adjusting, through OIS, the second camera module to operate in the target direction.

In an embodiment, the target shooting subject includes at least one of the following: a focus point in the view-finding area of the first camera module, a focus area determined by the focus point, a specified area in the view-finding area of the first camera module, or the view-finding area of the first camera module.

In an embodiment, the second camera module includes a camera. The operation of enabling the view-finding area of the second camera module to cover the target shooting subject includes: causing the target shooting subject to be within a same view-finding area of the second camera module or at a specific position in the same view-finding area of the second camera module. The specific position is a preset position or a position determined by a detected operation signal.

In an embodiment, the second camera module includes a camera, and a size of the target shooting subject is greater than a size of the view-finding area of the target shooting subject. The target direction at least includes two target sub-directions.

The operation that the field adjustment module 820 adjusts, through OIS, the second camera module to operate in the target direction includes: for each target sub-direction, adjusting, through OIS, the second camera module to operate in the target sub-direction.

The target shooting subject is within a first spliced view-finding area, and the first spliced view-finding area is obtained by splicing adjusted view-finding areas obtained through all adjustments.

The auxiliary image acquired by the second camera module includes auxiliary images, each acquired by an adjustment of the second camera module in the target sub-direction.

In an embodiment, the second camera module includes at least two cameras, and a size of the target shooting subject is greater than a size of the view-finding area of the target shooting subject. The target direction at least includes two target sub-directions.

The operation that the field adjustment module 820 adjusts, through OIS, the second camera module to operate in the target direction includes: adjusting, through OIS, a camera of the second camera module to operate in the corresponding target sub-directions respectively.

The target shooting subject is within a second spliced view-finding area, and the second spliced view-finding area is obtained by splicing adjusted view-finding areas of all the cameras in the second camera module.

The auxiliary image acquired by the second camera module includes: all images acquired by the adjusted camera.

In an embodiment, the fusion module 840 is further configured to: when the first camera module is in the dominant shooting state currently and the target shooting subject within the view-finding area of the first camera module is contained within the initial view-finding area of the second camera module, fuse the auxiliary image acquired by the second camera module with the dominant image acquired by the first camera module.

In another embodiment, the fusion is executed during view finding; or the fusion is executed after receiving a shooting operation instruction.

In another embodiment, the multiple camera modules include: a wide-angle camera module, a universal camera module, and a telephoto camera module, the field angles of which decrease successively.

Since the apparatus embodiments substantially correspond to the method embodiments, reference can be made to corresponding description in the method embodiments for related content. The apparatus embodiments described above are merely exemplary. The modules described as separate components may be or may be not separate physically, and components displayed as modules may be or may be not physical modules, and can be located at one place or distributed to multiple network modules. Some or all of the modules can be selected according to actual requirements to realize the purpose of the solutions of the disclosure. They can be understood and implemented by those skilled in the art without paying any inventive effort.

A computer-readable storage medium with a computer program stored thereon is also provided. The program, when executed by a processor, implements steps of any of the methods for image processing based on multiple camera modules.

The disclosure may be embodied by a computer program product implemented on one or more storage mediums having program codes thereon, including but not limited to a magnetic disk memory, a CD-ROM, an optical memory, etc. Storage mediums available for computers include permanent or non-permanent, mobile or non-mobile media, and may realize information storage through any method or technique. The information may be computer-readable instructions, data structures, program modules or other data. Examples of the storage medium for the computer include but are not limited to: a phase change memory (PCM), a static random access memory (SRAM), a dynamic random access memory (DRAM), other types of random access memories (RAMs), a read-only memory (ROM), an electrically erasable programmable read-only memory (EEPROM), a flash memory or other memory techniques, a compact disc read-only memory (CD-ROM), a digital video disc (DVD) or other optical storages, a cassette tape, a tape, a magnetic disk storage or other magnetic storages or any other non-transmission mediums that can store information accessible by a computing device.

An electronic device based on multiple camera modules is provided, including: at least two camera modules having different field angles; a processor; and a memory configured to store instructions executable by the processor. The processor is configured such that: when a first camera module is in a dominant shooting state currently and a target shooting subject within a view-finding area of the first camera module is not contained within an initial view-finding area of a second camera module, the view-finding area of the second camera module is adjusted so that the adjusted view-finding area of the second camera module covers the target shooting subject; a field angle of the second camera module is smaller than that of the first camera module; an auxiliary image is fused with a dominant image. The auxiliary image is acquired by the second camera module, and the dominant image is acquired by the first camera module.

Figure 9:
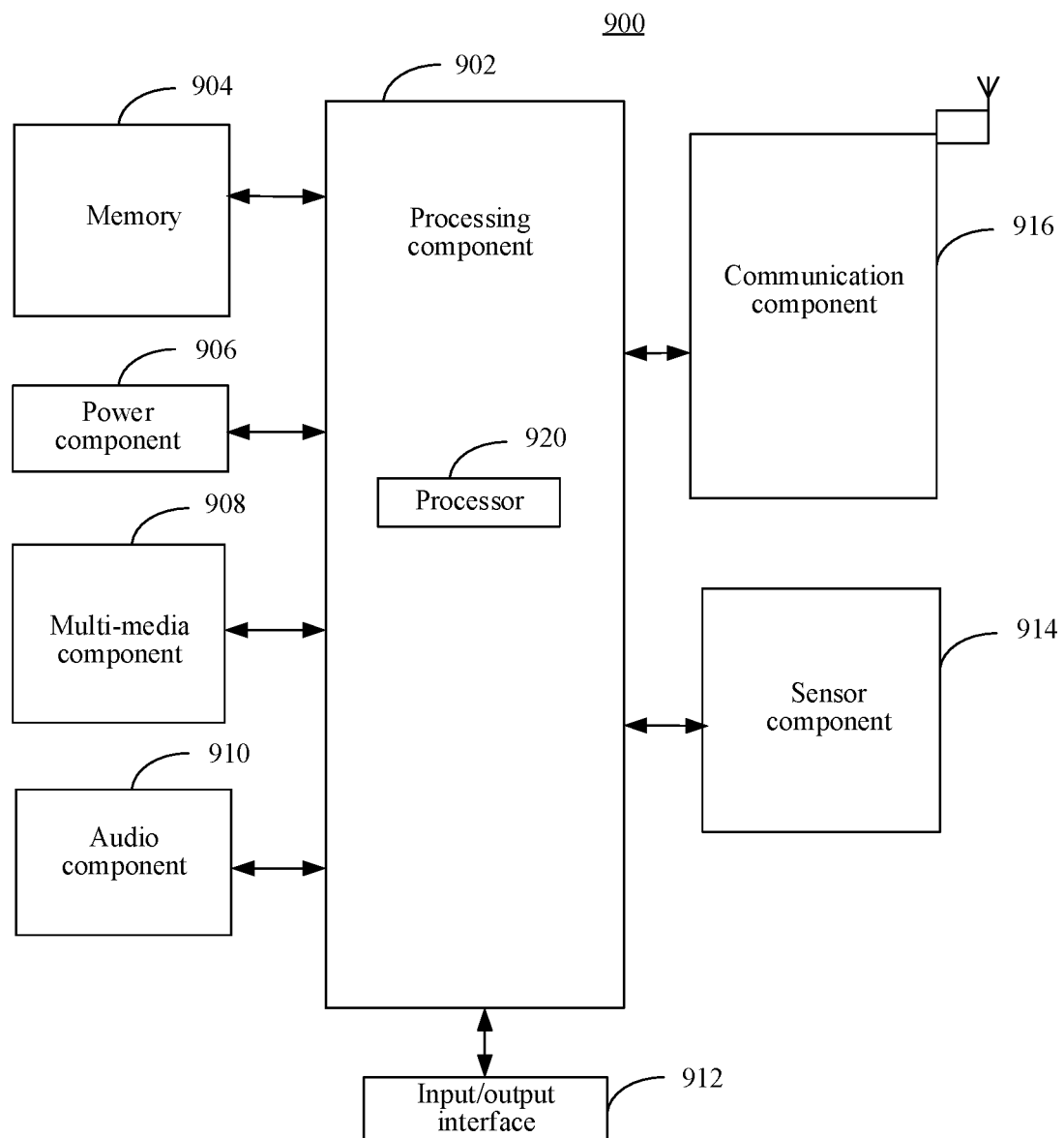
FIG. 9 illustrates a schematic diagram of an apparatus for image processing based on multiple camera modules according to some embodiments of the disclosure.

FIG. 9 illustrates a schematic diagram of an apparatus 900 for image processing based on multiple camera modules according to some embodiments. For example, the apparatus 900 may be user equipment, such as a mobile phone with a shooting function, a computer, a digital broadcast terminal, a message transceiving device, a game console, a tablet device, medical equipment, fitness equipment, a personal digital assistant, a wearable device such as a smart watch, smart glasses and smart wristband, etc.

As illustrated in FIG. 9, the apparatus 900 may include one or more of the following: a processing component 902, a memory 904, a power component 906, a multi-media component 908, an audio component 910, an input/output (I/O) interface 912, a sensor component 914, and a communication component 916.

The processing component 902 generally controls the overall operation of the apparatus 900, such as operations associated with display, a phone call, data communication, a camera operation and a recording operation. The processing component 902 may include one or more processors 920 to execute instructions, so as to complete all or some steps in the method above. In addition, the processing component 902 may include one or more modules for the interaction between the processing component 902 and the other components. For example, the processing component 902 may include a multi-media module for interaction between the multi-media component 908 and the processing component 902.

The memory 904 is configured to store various types of data so as to support operations at the apparatus 900. The examples of these types of data include instructions of any application or method for operating on the apparatus 900, contact person data, phone book data, messages, pictures, video, etc. The memory 904 may be implemented by any type of volatile or non-volatile storage device or a combination of both, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 906 supplies power for the various components of the apparatus 900. The power component 906 may include a power management system, one or more power sources, and other components associated with the generation, management and distribution of power for the apparatus 900.

The multi-media component 908 includes a screen serving as an output interface between the apparatus 900 and a user. In some embodiments, the screen may include a liquid crystal display (LCD) and a touch pad (TP). If the screen includes a touch pad, then the screen may be implemented as a touch screen so as to receive an input signal from the user. The touch pad includes one or more touch sensors to sense touch, slide and gestures on the touch pad. The touch sensors may not only sense the boundary of a touch or slide action, but also can detect the duration and pressure related to the touch or slide operation. In some embodiments, the multi-media component 908 includes a front camera and/or a rear camera. When the apparatus 900 is in an operating mode, such as a photography mode or a video mode, the front camera and/or the rear camera may receive external multi-media data. Each front camera and rear camera may be a fixed optical lens system or have a focal length or optical zoom capability.

The audio component 910 is configured to output and/or input an audio signal. For example, the audio component 910 includes a microphone (MIC), and when the apparatus 900 is in an operating mode, such as a calling mode, a recording mode and a voice recognition mode, the microphone is configured to receive an external audio signal. The received audio signal can be further stored in the memory 904 or sent via the communication component 916. In some embodiments, the audio component 910 further includes a loudspeaker for outputting an audio signal.

The I/O interface 912 provides an interface between the processing component 902 and a peripheral interface module, and the above peripheral interface module may be a keyboard, a click wheel, a button, etc. The button may include but is not limited to a home page button, a volume button, a start button and a locking button.

The sensor component 914 includes one or more sensors for providing state evaluation for the apparatus 900 from various aspects. For example, the sensor component 914 may detect an on/off state of the apparatus 900, and the relative positioning between components; for example the components are a display and keyboard of the apparatus 900. The sensor component 914 may also detect a position change of the apparatus 900 or a component of the apparatus 900, whether there is contact between a user and the apparatus 900, the orientation of the apparatus 900 or acceleration/deceleration of the apparatus 900, and a temperature change of the apparatus 900. The sensor component 914 may include a proximity sensor configured to detect the existence of an object nearby without any physical contact. The sensor component 914 may also include an optical sensor, such as a CMOS or CCD image sensor, for use in an imaging application. In some embodiments, the sensor component 914 may also include an acceleration sensor, a gyroscope sensor, a magnetic sensor, a pressure sensor or a temperature sensor.

The communication component 916 is configured for wired or wireless communication between the apparatus 900 and another device. The apparatus 900 may access a communication standard based wireless network, such as WiFi, 2G, 3G, 4G LTE, or 5G NR or a combination thereof. In some embodiments, the communication component 916 receives a broadcast signal or broadcast related information from an external broadcast management system through a broadcast channel. In some embodiments, the communication component 916 further includes a near-field communication (NFC) module for short-range communication. In some embodiments, the communication component 916 may be implemented based on the radio-frequency identification (RFID) technique, the infrared data association (IrDA) technique, the ultra-wide band (UWB) technique, the Bluetooth (BT) technique or others.

In some embodiments, the apparatus 900 may be implemented by one or more application-specific integrated circuits (ASICs), digital signal processors (DSPs), digital signal processing devices (DSPDs), programmable logic devices (PLDs), field programmable gate arrays (FPGAs), controllers, micro-controllers, micro-processors or other electronic elements, for executing the above methods.

In some embodiments, a non-transitory computer-readable storage medium is also provided, for example a memory 904 including instructions. The instructions in the storage medium, when executed by the processor 920 of the apparatus 900, enable the apparatus 900 to execute the above described method for image processing based on multiple photography modules. The non-transitory computer-readable storage medium may be a ROM, a random access memory (RAM), a CD-ROM, a magnetic tape, a floppy disk, an optical data storage device and so on.

The technical solutions provided in embodiments of the disclosure may have the following beneficial effects:

In the embodiments of the disclosure, in the case where a first camera module is in a dominant shooting state currently and a target shooting subject within a view-finding area of the first camera module is not contained in an initial view-finding area of a second camera module, the view-finding area of the second camera module is adjusted so that the adjusted view-finding area of the second camera module covers the target shooting subject; and an auxiliary image acquired by the second camera module is fused with a dominant image acquired by the first camera module, so as to achieve the effect of enhancing image quality. Further, since the second camera module is adjusted, the coverage of the second camera module is expanded, so that the adjusted view-finding area can cover an area not contained within the initial view-finding area. As such, image quality of at least part of the image area can be enhanced.

Other embodiments of the present disclosure will be apparent to those skilled in the art from consideration of the specification and practice of the disclosure disclosed here. The present disclosure covers any variations, uses, or adaptations of the present disclosure following the general principles thereof and including such departures from the present disclosure as come within known or customary practice in the art. The described embodiments are exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for image processing based on multiple camera modules, comprising:
   when a first camera module is in a dominant shooting state currently and a target shooting subject within a view-finding area of the first camera module is not contained within an initial view-finding area of a second camera module, adjusting the view-finding area of the second camera module so that the adjusted view-finding area of the second camera module covers the target shooting subject, wherein a field angle of the second camera module is smaller than that of the first camera module; and
   fusing an auxiliary image with a dominant image, wherein the auxiliary image is acquired by the second camera module, and the dominant image is acquired by the first camera module;
   wherein the target shooting subject is a subject concerned within the view-finding area of the first camera module, and adjusting the view-finding area of the second camera module comprises:
      determining a target direction according to a position relation between the target shooting subject and the initial view-finding area of the second camera module; and
      adjusting, through optical image stabilization (OIS), the second camera module to operate in the target direction to enable the adjusted view-finding area of the second camera module to cover the target shooting subject, and
   wherein: the second camera module comprises a camera, and a size of the target shooting subject is greater than a size of the view-finding area of the second camera module; the target direction comprises at least two target sub-directions; the adjusting, through OIS, the second camera module to operate in the target direction comprises: for each target sub-direction, adjusting, through OIS, the second camera module to operate in the target sub-direction; the target shooting subject is within a first spliced view-finding area, and the first spliced view-finding area is obtained by splicing adjusted view-finding areas obtained through all adjustments; and the auxiliary image acquired by the second camera module comprises auxiliary images each acquired by an adjustment of the second camera module in the target sub-direction; or
   the second camera module comprises at least two cameras, and the size of the target shooting subject is greater than the size of the view-finding area of the second camera module; the target direction comprises at least two target sub-directions; the adjusting, through OIS, the second camera module to operate in the target direction comprises: adjusting, through OIS, the cameras in the second camera module to operate in corresponding target sub-directions, respectively; the target shooting subject is within a second spliced view-finding area, and the second spliced view-finding area is obtained by splicing adjusted view-finding areas of all the cameras in the second camera module; and the auxiliary image acquired by the second camera module comprises all images acquired by adjusted cameras in the second camera module.

2. The method according to claim 1, wherein adjusting the view-finding area of the second camera module comprises:
   determining a current view-finding area of the second camera module; and
   adjusting, through OIS, the current view-finding area of the second camera module to a maximum range, to obtain a maximum view-finding area of the second camera module;
   wherein the target shooting subject is a shooting point in a part of the maximum view-finding area of the second camera module that does not overlap with the initial view-finding area.

3. The method according to claim 1, wherein the target shooting subject comprises at least one of:
   a focus point in the view-finding area of the first camera module;
   a focus area determined by the focus point;
   a specified area in the view-finding area of the first camera module; or
   the view-finding area of the first camera module.

4. The method according to claim 1, wherein the second camera module comprises a camera; and
   wherein enabling the adjusted view-finding area of the second camera module to cover the target shooting subject comprises: causing the target shooting subject to be within the adjusted view-finding area of the second camera module or at a specific position in the adjusted view-finding area of the second camera module, the specific position being one of a preset position or a position determined by a detected operation signal.

5. The method according to claim 1, further comprising:
   when the first camera module is in the dominant shooting state currently and the target shooting subject within the view-finding area of the first camera module is contained within the initial view-finding area of the second camera module, fusing the auxiliary image acquired by the second camera module with the dominant image acquired by the first camera module.

6. The method according to claim 1, wherein the fusing is executed during view finding or after receiving a shooting operation instruction.

7. The method according to claim 1 wherein the multiple camera modules comprise: a wide-angle camera module, a universal camera module, and a telephoto camera module, a field angle of the wide-angle camera module being larger than a field angle of the universal camera module, and the field angle of the universal camera module being larger than a field angle of the telephoto camera module.

8. An electronic device, comprising:
first and second camera modules having different field angles;
a processor; and
a memory configured to store instructions executable by the processor,
wherein the processor is configured to:
when the first camera module is in a dominant shooting state currently and a target shooting subject within a view-finding area of the first camera module is not contained within an initial view-finding area of the second camera module, adjust the view-finding area of the second camera module so that the adjusted view-finding area of the second camera module covers the target shooting subject, wherein a field angle of the second camera module is smaller than that of the first camera module; and
fuse an auxiliary image with a dominant image, wherein the auxiliary image is acquired by the second camera module, and the dominant image is acquired by the first camera module;
wherein the target shooting subject is a subject concerned within the view-finding area of the first camera module; and in adjusting the view-finding area of the second camera module, the processor is further configured to:
determine a target direction according to a position relation between the target shooting subject and the initial view-finding area of the second camera module; and
adjust, through optical image stabilization (OIS), the second camera module to operate in the target direction, to enable the adjusted view-finding area of the second camera module to cover the target shooting subject; and
wherein: the second camera module comprises a camera, and a size of the target shooting subject is greater than a size of the view-finding area of the second camera module; the target direction comprises at least two target sub-directions; in adjusting, through OIS, the second camera module to operate in the target direction, the processor is further configured to, for each target sub-direction, adjust, through OIS, the second camera module to operate in the target sub-direction; the target shooting subject is within a first spliced view-finding area, and the first spliced view-finding area is obtained by splicing adjusted view-finding areas obtained through all adjustments; and the auxiliary image acquired by the second camera module comprises auxiliary images each acquired by an adjustment of the second camera module in the target sub-direction; or
the second camera module comprises at least two cameras, and the size of the target shooting subject is greater than the size of the second camera module; the target direction comprises at least two target sub-directions; in adjusting, through OIS, the second camera module to operate in the target direction, the processor is further configured to, adjust, through OIS, the cameras in the second camera module to operate in corresponding target sub-directions, respectively; the target shooting subject is within a second spliced view-finding area, and the second spliced view-finding area is obtained by splicing adjusted view-finding areas of all the cameras in the second camera module; and the auxiliary image acquired by the second camera module comprises all images acquired by adjusted cameras in the second camera module.

9. The electronic device according to claim 8, wherein in adjusting the view-finding area of the second camera module, the processor is further configured to:
determine a current view-finding area of the second camera module; and
adjust, through OIS, the current view-finding area of the second camera module to a maximum range, to obtain a maximum view-finding area of the second camera module;
wherein the target shooting subject is a shooting point in a part of the maximum view-finding area of the second camera module that does not overlap with the initial view-finding area.

10. The electronic device according to claim 8, wherein the target shooting subject comprises at least one of:
a focus point in the view-finding area of the first camera module;
a focus area determined by the focus point;
a specified area in the view-finding area of the first camera module; or
the view-finding area of the first camera module.

11. The electronic device according to claim 8, wherein the second camera module comprises a camera; and
wherein in enabling the view-finding area of the second camera module to cover the target shooting subject, the processor is further configured to: cause the target shooting subject to be within the adjusted view-finding area of the second camera module or at a specific position in the adjusted view-finding area of the second camera module, the specific position being one of a preset position or a position determined by a detected operation signal.

12. The electronic device according to claim 8, wherein the processor is further configured to:
when the first camera module is in the dominant shooting state currently and the target shooting subject within the view-finding area of the first camera module is contained within the initial view-finding area of the second camera module, fuse the auxiliary image acquired by the second camera module with the dominant image acquired by the first camera module.

13. The electronic device according to claim 8, wherein fusing the auxiliary image with the dominant image is executed during view finding or after receiving a shooting operation instruction.

14. A non-transitory computer-readable storage medium having stored thereon a computer program that, when executed by a processor of a device, cause the device to perform a method for image processing based on multiple camera modules, the method comprising:
when a first camera module is in a dominant shooting state currently and a target shooting subject within a view-finding area of the first camera module is not contained within an initial view-finding area of a second camera module, adjusting the view-finding area of the second camera module so that the adjusted view-finding area of the second camera module covers the target shooting subject, wherein a field angle of the second camera module is smaller than that of the first camera module; and fusing an auxiliary image with a dominant image, wherein the auxiliary image is acquired by the second camera module, and the dominant image is acquired by the first camera module;

wherein the target shooting subject is a subject concerned within the view-finding area of the first camera module; and adjusting the view-finding area of the second camera module comprises:

determining a target direction according to a position relation between the target shooting subject and the initial view-finding area of the second camera module; and adjusting, through optical image stabilization (OIS), the second camera module to operate in the target direction to enable the adjusted view-finding area of the second camera module to cover the target shooting subject; and wherein: the second camera module comprises a camera, and a size of the target shooting subject is greater than a size of the view-finding area of the second camera module; the target direction comprises at least two target sub-directions; the adjusting, through OIS, the second camera module to operate in the target direction comprises: for each target sub-direction, adjusting, through OIS, the second camera module to operate in the target sub-direction; the target shooting subject is within a first spliced view-finding area, and the first spliced view-finding area is obtained by splicing adjusted view-finding areas obtained through all adjustments; and the auxiliary image acquired by the second camera module comprises auxiliary images each acquired by an adjustment of the second camera module in the target sub-direction; or the second camera module comprises at least two cameras, and the size of the target shooting subject is greater than the size of the view-finding area of the second camera module; the target direction comprises at least two target sub-directions; the adjusting, through OIS, the second camera module to operate in the target direction comprises: adjusting, through OIS, the cameras in the second camera module to operate in corresponding target sub-directions, respectively; the target shooting subject is within a second spliced view-finding area, and the second spliced view-finding area is obtained by splicing adjusted view-finding areas of all the cameras in the second camera module; and the auxiliary image acquired by the second camera module comprises all images acquired by adjusted cameras in the second camera module.

* * * * *